United States Patent [19]

Mochida

[11] 4,374,597
[45] Feb. 22, 1983

[54] REMOTE CONTROL ARRANGEMENT
[75] Inventor: Haruo Mochida, Yokohama, Japan
[73] Assignee: Nissan Motor Co., Ltd., Yokohama, Japan
[21] Appl. No.: 222,454
[22] Filed: Jan. 5, 1981
[30] Foreign Application Priority Data
  Jan. 10, 1980 [JP] Japan .................................. 55-1621
[51] Int. Cl.³ ........................ E05B 53/00; G05G 9/02
[52] U.S. Cl. ..................................... 292/8; 74/471 R; 74/501 R; 292/336.3
[58] Field of Search .......... 74/471 R, 501 R, 471 XY; 292/8, 28, 38, 50, 336.3

[56] References Cited
U.S. PATENT DOCUMENTS
2,480,083  8/1949  McMillan .......................... 74/471 R
3,891,252  6/1975  Lehmann ............................. 292/8 X
4,331,353  5/1982  Yazawa et al. ....................... 292/28

Primary Examiner—Ernest R. Purser
Attorney, Agent, or Firm—Thompson, Birch, Gauthier & Samuels

[57] ABSTRACT

A stopper is provided on the inner wire of a Bowden cable type arrangement. The stopper allows the wire to be pulled in a first axial direction to operate one of two latch mechanisms and engages a shoulder defined in the second latch mechanism when driven in a second axial direction to produce a reaction which causes the tubular housing disposed about the wire between the second latch mechanism and a single handled actuating mechanism, to flex and pull a lever of the second latch mechanism for operating same, whereby a single lever can be used to selectively operate two different mechanisms.

4 Claims, 3 Drawing Figures

A ← N → B

REMOTE CONTROL ARRANGEMENT

BACKGROUND OF THE INVENTION

1. Field of the Invention

The present invention relates generally to remote control arrangements for opening vehicular trunk lids, fuel filler covers and the like and more specifically to an arrangement wherein a single lever is used to selectively open two different lid members such as a trunk lid and fuel filler lid or cover.

2. Description of the Prior Art

In a known arrangement the remote control of a latch mechanism of a trunk lid or the like has been operated by a lever mechanism and Bowden cable. However, in the case in which it is desired to selectively open more than one lid from the cabin of the vehicle by way of example, it has been necessary to provide a lever and cable arrangement for each of the lids. This of course has led to an undesirable duplication of levers and cables and added to weight, complexity and cost of the vehicle.

SUMMARY OF THE INVENTION

The present invention features an actuating mechanism having a single lever and a Bowden cable arrangement leading therefrom to two latch mechanisms. Movement of the single lever in a first direction from its neutral position pulls the inner wire of the cable arrangement toward the actuating mechanism to operate the first of two latch mechanisms. A stopper is provided on the wire and arranged to abut a stationary member of the second of two latch mechanisms upon the lever's being moved from neutral in a second direction opposite the first. The abutment induces a reaction which causes the outer housing of the cable arrangement surrounding that portion of the wire extending between the lever mechanism and the second of the latch mechanisms to flex and pull a lever attached to the end of said outer housing adjacent the stopper to operate the second latch mechanism.

BRIEF DESCRIPTION OF THE DRAWINGS

The features and advantages of the arrangement of the present invention will become more clearly appreciated from the following description taken in conjunction with the accompanying drawings in which like reference numerals denote corresponding elements, and in which FIG. 1 schematically shows an embodiment of the present invention.

DETAILED DESCRIPTION OF THE PREFERRED EMBODIMENT

Figure 1:
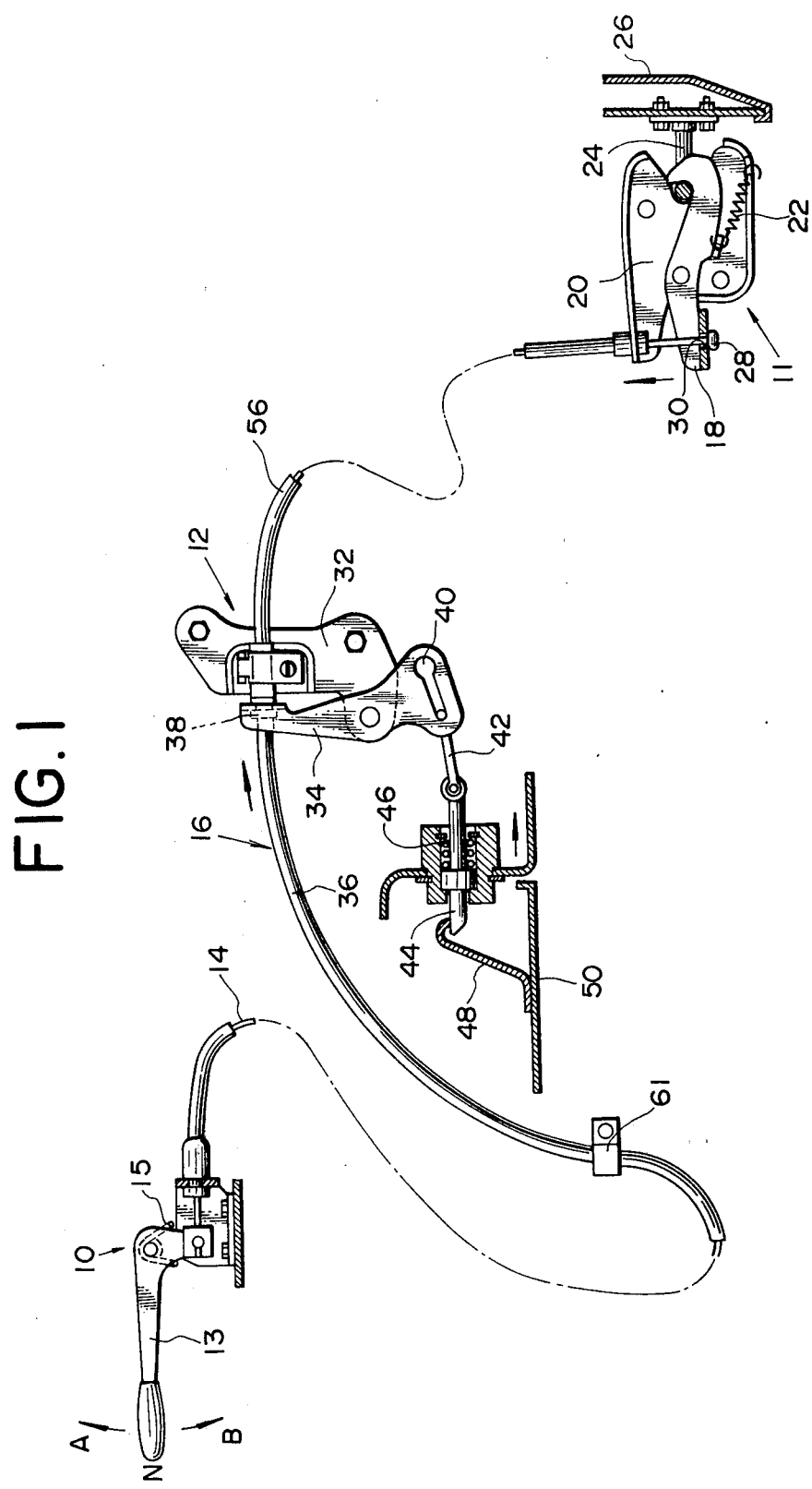

Turning now to the drawings and more specifically to FIG. 1, a first embodiment of the present invention is shown. In FIG. 1 the numeral 10 denotes an actuating mechanism having a single lever 13, while 11 and 12 denote first and second latch mechanisms, respectively. The lever 13 of the actuating mechanism 10 is operatively connected to an inner wire 14 of a Bowden cable arrangement 16 interconnecting the actuating mechanism 10 and the first and second latch mechanisms 11 and 12 and is biased by a spring 15 toward a neutral position N. As shown in FIG. 1 the inner wire 14 extends continuously from the actuating mechanism to a detent lever 18 of the first latch mechanism 11. This lever is pivotally mounted on a base plate 20 which in turn is fixed to the chassis or the like of a vehicle (by way of example). A spring 22 interconnects the detent lever 18 with the base plate 20 in a manner to cause the lever to rotate in a direction to engage a locking bar 24 fixedly secured to a first lid 26 which closes a storage compartment or the like (not shown). The inner wire 14 is formed with a bead 28 on the end which seats in a suitable aperture 30 formed in the lever 18. With this arrangement, upon closure of the lid 26 the detent lever 18 will be slightly rotated in the clockwise direction (as seen in FIG. 1). However, this will not influence the inner wire 14 due to the effective lost motion connection established between the inner wire 14 and the detent lever 18 through the bead 28 and aperture 30.

When the lever 13 is rotated in the direction indicated by arrow A, the inner wire 14 will be pulled in the direction of the actuating mechanism and will accordingly induce the detent lever 18 to rotate in the clockwise direction to release the connection between said lever and the locking bar 24, thus unlocking the lid 26.

Figure 2:
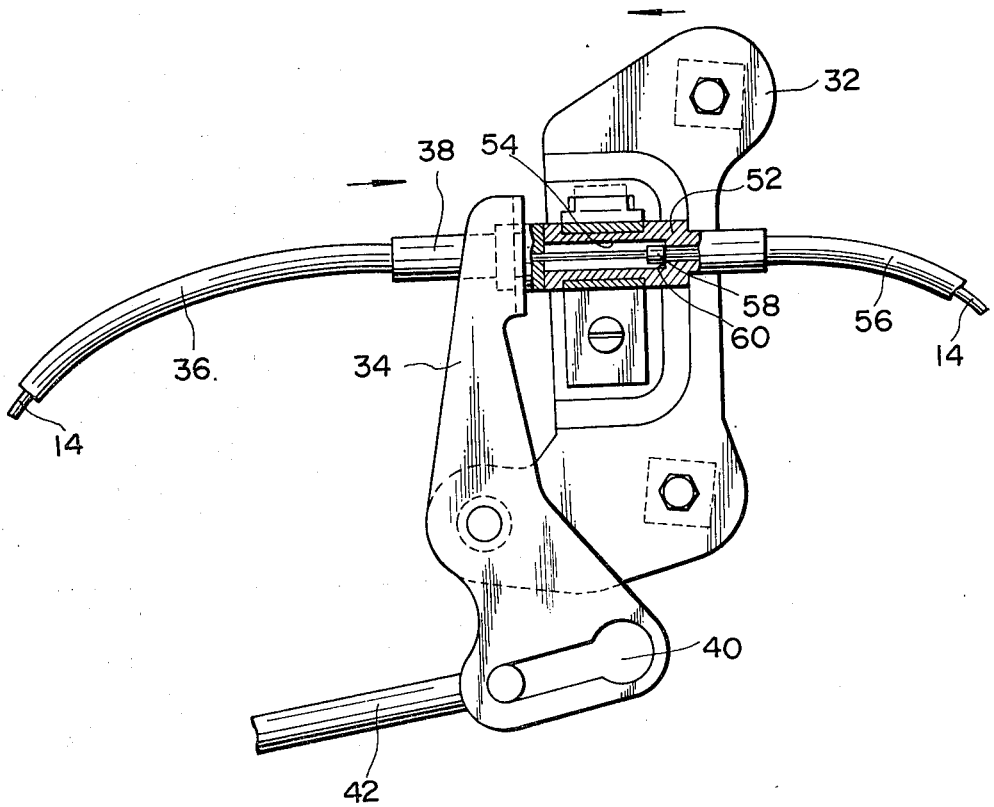
FIG. 2 is an enlarged sectional view of a part of the arrangement shown in FIG. 1.

FIG. 2 shows in detail part of the second latch mechanism 12. In this mechanism the numeral 32 denotes a base plate which is fixed to the chassis of the vehicle or the like, and on which a lever 34 is pivotally mounted. One end of the lever 34 is operatively connected to one end of the outer housing 36 which surrounds that part of the inner wire 14 extending between the actuating mechanism 10 and the second latch mechanism 12 through a re-inforcement end member 38. The other end of the lever 34 is provided with a slot 40 which slidably receives the end of the link 42 which extends between the lever 34 and a detent pin 44 (see FIG. 1). The pin 44 is biased by a spring 46 to extend toward and engage a flange member 48 of a second lid 50 of the vehicle. It will also be understood that the slot 40 cooperating with the link 42 defines a lost motion connection which allows the second lid 50 to be closed and displace the detent pin 44 against the bias of the spring 46 without influencing the lever 34 or the outer housing 36.

FIG. 2 shows in section a tubular member 52 formed with a stepped bore 54. The member 52 is fixedly connected to the base plate 32 and serves to mount one end of a second outer housing 56 which extends between the first and second latch mechanisms 11 and 12. The other end of the second outer housing 56 is fixedly connected to the base plate 20 of the first latch mechanism (see FIG. 1).

A stopper 58 is fixed onto the inner wire 14 by welding, brazing, soldering or the like. The stopper is dimensioned to be slidable within the larger portion of the stepped bore and to abut a shoulder 60 defined in the stepped bore. Thus, when the lever 13 is moved in the direction indicated by arrow B (see FIG. 1), the stopper is moved into abutment with the shoulder so that further travel of the inner wire 14 away from the actuating mechanism 10 is limited. Further movement of the lever 13 in the B direction induces a reaction which causes the portion of the inner wire between the actuating mechanism 10 and the second latch mechansim 12, and subsequently the outer housing 36 surrounding said portion of the wire, to flex. The flexture of the outer housing allows the inner wire to be inserted further into the outer housing by the movement of the lever 13 so that the distance between the stopper 58 and the reinforcing end member 38 which is fixed to the end of the housing 36, increases with the result that the lever 34 is pulled by the outer housing 36 and rotates in the anticlockwise direction, retracting the detent pin 44 from its securing position via the linkage connection therebetween, which unlocks the lid 50.

If required, a bracket or brackets 61 may be used to slidably support the outer housing 36 and/or 56 at locations intermediate of the actuating mechanism and first and second latch mechanisms 11 and 12.

Thus in summary, the stopper 58 allows the movement of the inner wire in a direction which allows the release of the first latch mechanism but resists movement in the opposite direction to induce a reaction which causes it and the outer housing member surrounding same to flex and accordingly induce the outer housing the pull a lever of the second latch mechanism to release same. In other words, when the lever is urged in the A direction, the wire is pulled with respect to the outer housing (which remains axially stationary) to operate the first latch mechanism 11 in the conventional manner. When the lever is urged in the B direction, the roles of the wire and outer housing are reversed, and the outer housing is pulled with respect to the cable (which is held axially stationary by the stopper 58 engaging the shoulder 60) to operate the second latch mechanism 12, independently of the first latch mechanism. This unique arrangement allows two latch mechanisms to be individually or selectively released by the movement of a lever of an actuating mechanism in first or second directions.

Figure 3:
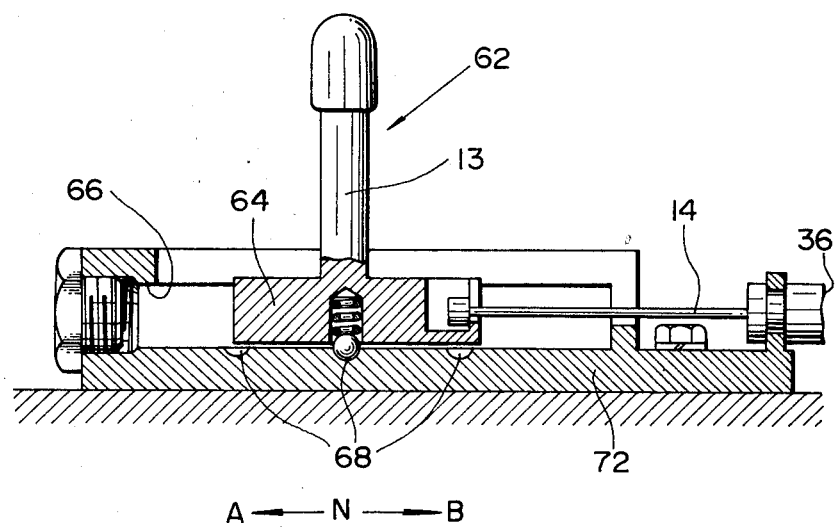
FIG. 3 is a sectional view of an alternative lever arrangement which may be used in place of that shown in FIG. 1.

FIG. 3 shows an alternative actuating mechanism 62 which can be used with the Bowden cable arrangement 16 of the present invention. In this arrangement, the lever 13 is formed with a slidable member 64 which slides in a bore or the like 66. The bore 66 is formed with indents 68 in which a spring loaded detent ball 70 carried in the slidable member is seatable. The slidable member 64 is further formed with a slot for receiving a bead carried on the end of the inner wire 14. As shown, the inner wire 14 extends from the slidable member into the outer housing 36, which is fixed securely to the base member 72 in which the bore 66 is formed. The bore is slotted to allow the lever 13 to be slid back and forth from the neutral position N in the directions A and B for operating the first and second latch mechanisms. The indents 68 are each formed to correspond to the neutral position, first latch mechanism release position and the second latch mechanism release position. This arrangement of course features simple construction and assembly.

What is claimed is:

1. A remote control arrangement comprising:
   a first mechanism having a stationary member and a movable member for actuating said first mechanism;
   a second mechanism having a stationary member and a movable member for actuating said second mechanism;
   a wire connected at one end to the movable member of said first mechanism and which is slidably disposed through the stationary member of said second mechanism;
   an actuating mechanism having a stationary member and a lever, said lever being operatively connected to the other end of said wire for selectively moving said wire in first and second axial directions, the movable member of said first mechanism being moved to operate said first mechanism upon said wire being moved in said first axial direction;
   a first flexible housing disposed about said wire, said first houring being connected at one end to the stationary member of said actuating mechanism and at the other end of the movable member of said second mechanism;
   a second flexible housing disposed about said wire, said second housing being connected at one end to the stationary member of said second mechanism and at the other end to the stationary member of said first mechanism; and
   a stopper fixed on said wire and adapted to abut the stationary member of said second mechanism when said wire is driven in said second axial direction.

2. A remote control arrangement as claimed in claim 1, wherein said first mechanism takes the form of a latch mechanism and a lid, said latch mechanism having a base which defines said stationary member and a detent lever which defines said movable member, said detent lever being pivotally mounted on said base member and biased in a direction to engage a lock bar of said lid, said wire being formed with a bead at the end thereof which seats in an aperture formed in said detent lever, said aperture and said bead defining a lost motion connection which allows said detent lever to rotate in the rotational direction induced therein by the movement of said wire in said first axial direction.

3. A remote control arrangement as claimed in claim 1, wherein said second mechanism takes the form of a second latch mechanism and a second lid which cooperates with said second latch mechanism, said second latch mechanism including a base member including means defining a stepped bore through which said wire is disposed, said stepped bore defining a shoulder against which said stopper engages when said wire is moved in said second axial direction, the engagement between said shoulder and said stopper inducing a reaction in said wire which causes said first flexible housing to flex and to pull a lever pivotally mounted on said base member, which lever defines said movable member of said second mechanism.

4. A remote control arrangement as claimed in claim 1, wherein said actuating mechanism takes the form of a base member formed with a stepped bore, a slidable member disposed in said bore, said slidable member being fixedly secured to said lever for synchronous movement therewith and operatively connected with said wire, said slidable member having a spring loaded ball which seatably engages in indents formed in said stepped bore for holding said slidable member in one of a neutral, first and second axial positions.

* * * * *